(12) United States Patent
Cho et al.

(10) Patent No.: US 12,506,226 B2
(45) Date of Patent: Dec. 23, 2025

(54) BATTERY MODULE AND METHOD FOR MANUFACTURING THE SAME

(71) Applicant: LG ENERGY SOLUTION, LTD., Seoul (KR)

(72) Inventors: Young Bum Cho, Daejeon (KR); Seung Joon Kim, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 840 days.

(21) Appl. No.: 17/426,324

(22) PCT Filed: Dec. 4, 2019

(86) PCT No.: PCT/KR2019/017026
§ 371 (c)(1),
(2) Date: Jul. 28, 2021

(87) PCT Pub. No.: WO2020/184813
PCT Pub. Date: Sep. 17, 2020

(65) Prior Publication Data
US 2022/0102813 A1 Mar. 31, 2022

(30) Foreign Application Priority Data
Mar. 12, 2019 (KR) .................. 10-2019-0028249

(51) Int. Cl.
*H01M 50/507* (2021.01)
*H01M 10/04* (2006.01)
(Continued)

(52) U.S. Cl.
CPC ..... *H01M 50/507* (2021.01); *H01M 10/0413* (2013.01); *H01M 50/178* (2021.01);
(Continued)

(58) Field of Classification Search
CPC .. H01M 50/516; H01M 50/54; H01M 50/178; H01M 50/211; H01M 50/553;
(Continued)

(56) References Cited

U.S. PATENT DOCUMENTS 6,042,966 A 3/2000 Cheu
2003/0049527 A1* 3/2003 Yageta ................ H01M 50/553
429/129
(Continued)

FOREIGN PATENT DOCUMENTS

CN 1508899 A 6/2004
CN 103165847 A 6/2013
(Continued)

OTHER PUBLICATIONS

Shin-Etsu Silicone, "One-component liquid rubbers", <https://www.shinetsusilicone-global.com/products/type/one_rtv/index.shtml> (Year: 2015).*

(Continued)

*Primary Examiner* — Jessie Walls-Murray
(74) *Attorney, Agent, or Firm* — Birch, Stewart, Kolasch & Birch, LLP (57) ABSTRACT

A battery module a battery cell stack in which a plurality of battery cells are stacked, a busbar frame connected to the battery cell stack, cell terraces each protruding from battery cells adjacent to each other among the battery cells included in the battery cell stack, electrode leads each protruding from the cell terraces, and an insulating adhesive layer which is located between electrode leads adjacent to each other among the electrode leads and cover the boundary between the cell terrace and the electrode lead, wherein the insulating adhesive layer is in close contact with a stepped part formed by the cell terrace and the electrode lead.

14 Claims, 8 Drawing Sheets

(51) Int. Cl.
  *H01M 50/178* (2021.01)
  *H01M 50/211* (2021.01)
  *H01M 50/50* (2021.01)
  *H01M 50/516* (2021.01)
  *H01M 50/54* (2021.01)
  *H01M 50/548* (2021.01)
  *H01M 50/553* (2021.01)
  *H01M 50/557* (2021.01)
  *H01M 50/562* (2021.01)
  *H01M 50/566* (2021.01)
  *H01M 50/588* (2021.01)
  *H01M 50/593* (2021.01)

(52) U.S. Cl.
  CPC ......... *H01M 50/211* (2021.01); *H01M 50/50* (2021.01); *H01M 50/516* (2021.01); *H01M 50/54* (2021.01); *H01M 50/548* (2021.01); *H01M 50/553* (2021.01); *H01M 50/557* (2021.01); *H01M 50/562* (2021.01); *H01M 50/566* (2021.01); *H01M 50/588* (2021.01); *H01M 50/593* (2021.01)

(58) Field of Classification Search
  CPC . H01M 50/557; H01M 50/566; H01M 50/503
  See application file for complete search history.

(56) References Cited

U.S. PATENT DOCUMENTS

| | | | |
|---|---|---|---|
| 2004/0121231 A1 | 6/2004 | Kim | |
| 2006/0057286 A1 | 3/2006 | Gibbons et al. | |
| 2012/0082891 A1* | 4/2012 | Ahn | H01M 50/54 429/246 |
| 2012/0208076 A1 | 8/2012 | Hohenthanner et al. | |
| 2013/0149586 A1 | 6/2013 | Hong | |
| 2014/0272508 A1* | 9/2014 | Musetti | H01M 50/20 429/99 |
| 2014/0370366 A1* | 12/2014 | Higuchi | H01M 50/566 429/158 |
| 2015/0132622 A1* | 5/2015 | Gohl | H01M 50/569 429/90 |
| 2016/0020481 A1 | 1/2016 | He et al. | |
| 2016/0226043 A1* | 8/2016 | Lee | H01M 50/178 |
| 2017/0352933 A1 | 12/2017 | Choi et al. | |
| 2018/0183020 A1* | 6/2018 | Ju | H01M 50/548 |
| 2018/0194235 A1 | 7/2018 | Kim et al. | |
| 2018/0269435 A1 | 9/2018 | Lee et al. | |
| 2018/0315979 A1 | 11/2018 | Ryu et al. | |
| 2019/0260007 A1* | 8/2019 | Wang | H01M 10/425 |
| 2020/0035966 A1* | 1/2020 | Jin | H01M 50/548 |
| 2020/0067066 A1* | 2/2020 | Kim | H01M 50/124 |
| 2021/0036295 A1* | 2/2021 | Park | H01M 50/553 |
| 2021/0043981 A1* | 2/2021 | Fukuoka | H01M 50/289 |
| 2021/0376426 A1* | 12/2021 | Ichikawa | H01M 50/264 |
| 2022/0149484 A1* | 5/2022 | Jeong | H01M 50/557 |
| 2022/0181749 A1* | 6/2022 | Lee | H01M 50/507 |

FOREIGN PATENT DOCUMENTS

| | | | | |
|---|---|---|---|---|
| CN | 105099353 A | | 10/2015 | |
| CN | 107925028 A | | 4/2018 | |
| CN | 108028415 A | | 5/2018 | |
| EP | 3109925 A1 | * | 12/2016 | ............. B60L 50/64 |
| EP | 3239237 A1 | * | 11/2017 | ......... B29C 45/0001 |
| JP | 2000-11969 A | | 1/2000 | |
| JP | 2000208111 A | * | 7/2000 | ............. Y02E 60/10 |
| JP | 2004-158434 A | | 8/2004 | |
| JP | 2008-512843 A | | 4/2008 | |
| JP | 2010-182542 A | | 8/2010 | |
| JP | 2013-502675 A | | 1/2013 | |
| JP | 2014-53316 A | | 3/2014 | |
| JP | 2016-513855 A | | 5/2016 | |
| JP | 2016-162744 A | | 9/2016 | |
| JP | 2019-500736 A | | 1/2019 | |
| KR | 10-1045858 B1 | | 7/2011 | |
| KR | 10-2015-0111160 A | | 10/2015 | |
| KR | 10-2016-0138809 A | | 12/2016 | |
| KR | 10-2017-0075950 A | | 7/2017 | |
| KR | 10-2017-0103232 A | | 9/2017 | |
| KR | 10-2018-0119321 A | | 11/2018 | |
| WO | WO-2017138709 A1 | * | 8/2017 | ......... H01M 10/0472 |

OTHER PUBLICATIONS

Electrolock Inc. ("PET Insulation Materials and Applications", <https://www.electrolock.com/thought-leadership/pet-insulation-materials-and-applications>, accessed 2024) (Year: 2024).*

Aurora Material Solutions ("PBT (Polybutylene Terephthalate)", <https://auroramaterialsolutions.com/materials/pbt>, accessed 2024) (Year: 2024).*

Machine translation of Shioda et al. (JP 2000-208111) obtained 2025 (Year: 2000).*

Extended European Search Report for European Application No. 19918904.4, dated Feb. 11, 2022.

International Search Report issued in PCT/KR2019/017026, dated Apr. 3, 2020.

* cited by examiner

【FIG. 1】

Prior Art

【FIG. 2a】

Prior Art

[FIG. 2b]

Prior Art

Prior Art

BATTERY MODULE AND METHOD FOR MANUFACTURING THE SAME

CROSS CITATION WITH RELATED APPLICATION(S)

This application claims the benefit of priority based on Korean Patent Application No. 10-2019-0028249 filed with the Korean Intellectual Property Office on Mar. 12, 2019, the disclosure of which is incorporated herein by reference in its entirety.

The present disclosure relates to a battery module and a method for manufacturing the same, and more particularly to a battery module which prevents stability problems caused by unintended electrical connection, and a method for manufacturing the same.

TECHNICAL FIELD+

Background Art

Secondary batteries, which are easily applied to various product groups and has electrical characteristics such as high energy density, are universally applied not only for a portable device but also for an electric vehicle (EV) or a hybrid electric vehicle (HEV), an energy storage system or the like, which is driven by an electric driving source. The secondary battery is attracting attention as a new environment-friendly energy source for improving energy efficiency since it gives a primary advantage of remarkably reducing the use of fossil fuels and also does not generate by-products from the use of energy at all.

A battery pack for use in electric vehicles has a structure in which a plurality of cell assemblies, each including a plurality of unit cells, are connected in series to obtain a high output. In addition, the unit cell can be repeatedly charged and discharged by electrochemical reactions among components, which include a positive electrode current collector, a negative electrode current collector, a separator, an active material, an electrolyte and the like.

Meanwhile, as the need for a large capacity structure is increasing along with the utilization as an energy storage source in recent years, there is a growing demand for a battery pack with a multi-module structure in which a plurality of battery modules, each including a plurality of secondary batteries connected in series and/or in parallel, are integrated.

Meanwhile, when a plurality of battery cells are connected in series or in parallel to configure a battery pack, it is common to configure a battery module composed of at least one battery cell first, and then configure a battery pack by using at least one battery module and adding other components.

A conventional battery module includes a plurality of stacked battery cells and a busbar assembly for electrically connecting electrode leads of the plurality of battery cells. Here, the busbar assembly includes a busbar frame having lead slots through which the electrode leads of the battery cells pass individually, and a busbar mounted to the busbar frame and having busbar slots corresponding to the number of lead slots, so that the busbar is connected to the electrode leads passing through the busbar slots by welding or the like.

However, in the conventional battery module, when the number of cell terrace and battery cell increases, the number of electrode leads also increases, and the electrode lead and cell terrace shapes may become compact, and thus, adjacent electrode leads can come into in contact with the edge of the cell terrace.

Figure 1:
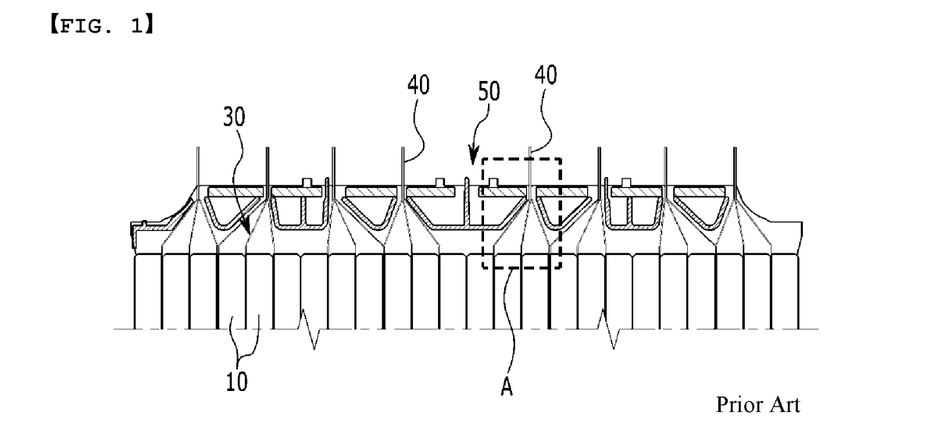
FIG. 1 is a view showing a busbar frame in a conventional battery module.

FIG. 1 is a diagram showing a busbar frame in a conventional battery module. FIG. 2 is an enlarged view of a region "A" in FIG. 1. Specifically, FIG. 2a is a cross-sectional view showing the possibility that an electrode lead 40 and the edge of a cell terrace 30 come into contact with each other, and FIG. 2b is a cross-sectional view showing that an insulating tape 60 is attached to prevent the electrode lead 40 from coming into contact with the edge of the cell terrace 30.

Referring to FIG. 1, a plurality of battery cells 10 are stacked, and at least one or more electrode leads 40 protruding from the cell terrace 30 extended from a pouch covering the battery cell 10 meets and passes through one lead slot.

Figure 2A:
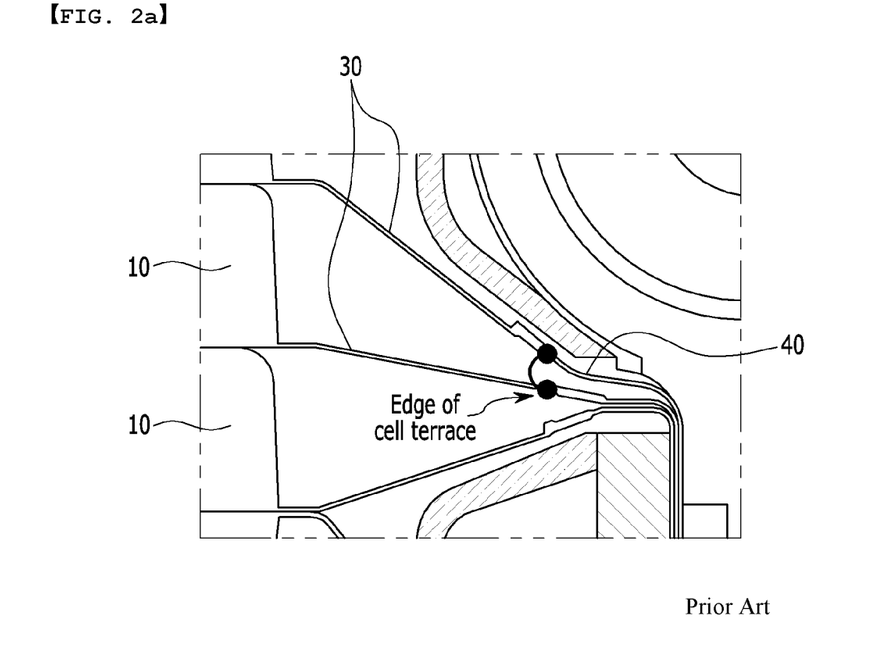
FIG. 2a is an enlarged view of a region "A" in FIG. 1.

Referring to FIG. 2a, when having a structure that becomes gradually narrower as the interval between adjacent cell terraces 30 moves away from the battery cell 10, the electrode lead 40 and the edge of the cell terrace 30 become close to each other, and they can come into contact with each other. When the electrode lead 40 comes into contact with the edge of the cell terrace 30, the cell terrace 30 has a potential, and the life of the battery cell 10 may be shortened or the pouch may be corroded.

Figure 2B:
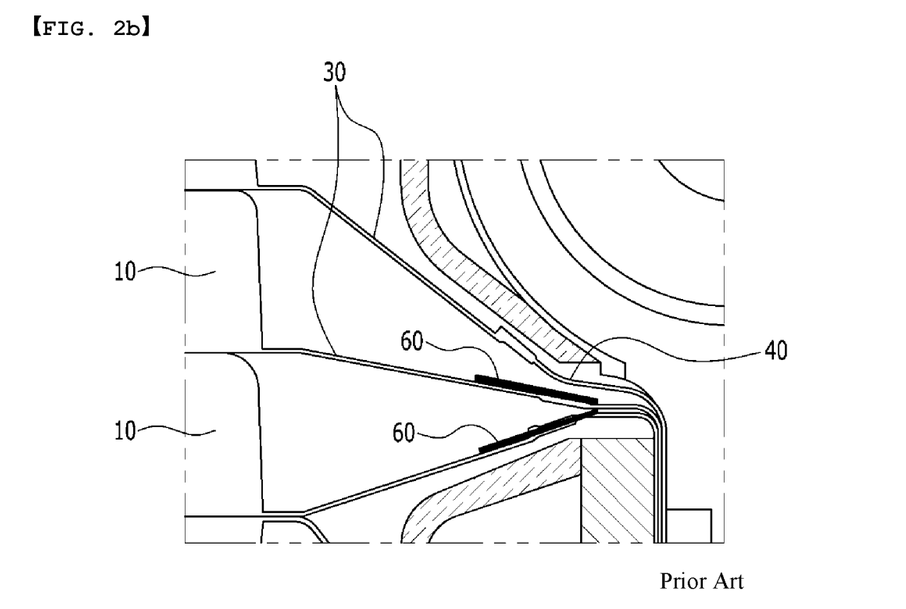
FIG. 2b is an enlarged view of a region "A" in FIG. 1 having an insulating tape.

Referring to FIG. 2b, a separate insulating tape 60 can be attached in order to prevent contact between the above-mentioned electrode lead 40 and the edge of the cell terrace 30. However, the method of attaching the insulating tape 60 requires additional fees and processes, and if the attachment position is not appropriate, there is still a possibility that contact will occur. In addition, since the adhesive strength of the insulating tape 60 is not permanently maintained, the insulating tape 60 is likely to be detached.

DETAILED DESCRIPTION OF THE INVENTION

Technical Problem

The present disclosure has been made to solve the above problems, and it is therefore an object of the present disclosure to provide a battery module that allows the electrode leads not to make contact with the edge of the cell terrace adjacent thereto, and a method for manufacturing the same.

However, the problem to be solved by the embodiments of the present disclosure is not limited to the above-described problems, and can be variously expanded within the scope of the technical idea included in the present disclosure.

Technical Solution

A battery module according to one embodiment of the present disclosure includes: a battery cell stack in which a plurality of battery cells are stacked, busbar frame connected to the battery cell stack, cell terraces each protruding from battery cells adjacent to each other among the battery cells included in the battery cell stack, electrode leads each protruding from the cell terraces, anal an insulating adhesive layer which is located between electrode leads adjacent to each other among the electrode leads and cover the boundary between the cell terrace and the electrode lead, wherein the insulating adhesive layer is in close contact with a stepped part formed by the cell terrace and the electrode lead.

The insulating adhesive layer may be formed of a one-component liquid adhesive.

The electrode leads adjacent to each other with the insulating adhesive layer being interposed therebetween may have the same polarity.

The cell terraces in which the electrode leads having the same polarity protrude out may have a narrower interval along a direction in which the electrode leads protrude out.

The electrode lead is inserted into a lead slot formed on the busbar frame, and an electrode lead connected to one end of the cell terraces adjacent to each other and the other end can maintain a separation state by the insulating adhesive layer.

The linear distance from the end of the insulating adhesive layer to the end of the battery cell can be equal to or shorter than a shorter linear distance of the a linear distances from a starting point where each of a first electrode lead and a second electrode lead adjacent to each other, with the insulating adhesive layer being interposed therebetween, protrude from the cell terrace, to the end of the battery cell.

The electrode leads adjacent to each other with the insulating adhesive layer being interposed therebetween pass through a lead slot formed on the busbar frame, and can meet and weld at the rear surface of the busbar frame.

A plurality of path guiders for separating the electrode leads are formed on the busbar frame, and at least one insulating layer can be formed between the path guiders adjacent to each other among the plurality of path guiders.

The electrode leads include a first electrode lead, a second electrode lead, and a third electrode lead which are adjacent to each other, the insulating adhesive layer includes a first insulating adhesive layer located between the first electrode lead and the second electrode lead, and a second insulating adhesive layer located between the second electrode lead and the third electrode lead, and the first insulating adhesive layer and the second insulating adhesive layer may come into contact with the second electrode lead.

A method for manufacturing a battery module according to another embodiment of the present disclosure includes the steps of: stacking a plurality of battery cells to form a battery cell stack, and connecting a busbar frame to the battery cell stack such that an insulating adhesive layer is disposed between the cell terraces protruding from each of the battery cells, wherein the insulating adhesive layer located between the electrode leads adjacent to each other among the electrode leads each protruding from the cell terraces, and wherein the insulating adhesive layer may be formed of a one-component liquid adhesive that applies a step formed at a boundary between the cell terrace and the electrode lead.

The one-component liquid adhesive may be applied using one of a jetting valve, a spray method, and a pad printing method.

The step of forming the insulating adhesive layer may include disposing a supply part of the one-component liquid adhesive on one surface of the battery cell; forming the one-liquid liquid adhesive at a boundary between the cell terrace and the electrode lead located on the same plane as one surface of the battery cell via the supply part; inverting the battery cell by 180 degrees such that the other side of the battery cell is directed toward the supply part, and forming the one-liquid liquid adhesive at a boundary portion between the cell terrace and the electrode lead located on the same plane as the other surface of the battery cell.

Advantageous Effects

According to the embodiments, it is possible to implement a battery module in which an insulating adhesive layer made of a one-component liquid adhesive is formed between the electrode lead and the edge of the cell terrace adjacent thereto, thereby allowing the electrode lead not to come into contact with the edge of the cell terrace adjacent thereto, and preventing a phenomenon where a pouch is corroded and a cell life is reduced.

In addition, by forming the insulating adhesive layer using a liquid adhesive, the reliability of the adhesive strength can be improved compared to a conventional insulating tape.

Further, by using a one-component liquid adhesive, the cost can be reduced by eliminating the step of mixing a stock liquid and a curing agent required for the two-component liquid adhesive.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element and intervening elements may also be present. In contrast, when an element is referred to as being "directly on" another element, it means that other intervening elements are not present. Further, the word "on" or "above" means disposed on or below a reference portion, and does not necessarily mean being disposed on the upper side of the reference portion toward the opposite direction of gravity.

Further, throughout the specification, when a part is referred to as "including" a certain component, means that it can further include other components, without excluding the other components, unless otherwise stated.

Further, throughout the specification, when referred to as "planar", it means when a target portion is viewed from the top, and when referred to as "cross-sectional", it means when a target portion viewed from the side of a cross section cut vertically.

Figure 3:
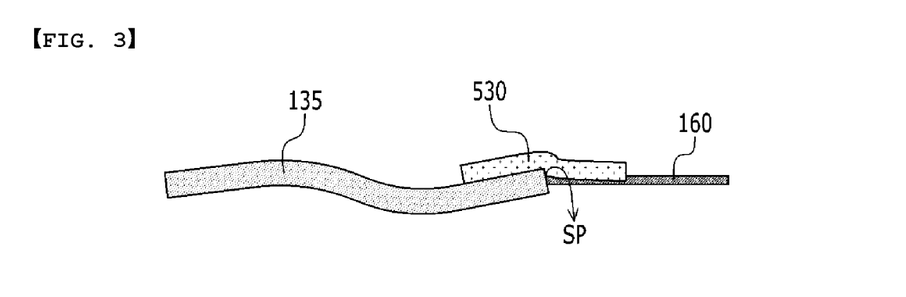
FIG. 3 is a view showing a state in which an insulating adhesive layer is formed at a boundary between a cell terrace and an electrode lead in a battery module according to one embodiment of the present disclosure.
Figure 4:
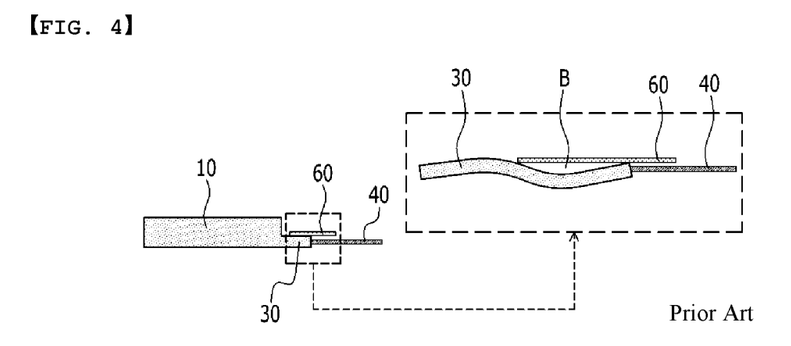
FIG. 4 is a view showing an insulating tape according to a comparative example.

FIG. 3 is a view showing a state in which an insulating adhesive layer is formed at a boundary between a cell terrace and an electrode lead in a battery module according to one embodiment of the present disclosure. FIG. 4 is a view showing an insulating tape according to a comparative example.

Referring to FIG. 3, in the battery module according to the present embodiment, the insulating adhesive layer 530 covers the boundary between cell terrace 135 and an electrode lead 160. The insulating adhesive layer 530 can be in close contact with a stepped part (SP) formed by the cell terrace 135 and the electrode lead 160. The insulating adhesive layer 530 is formed of a one-component liquid adhesive. In this regard, since the insulating adhesive layer 530 is formed using a liquid adhesive, the reliability of the adhesive strength can be improved compared to conventional insulating tape. Specifically, referring to FIG. 4, as a comparative example, an insulating tape 60 is formed between a cell terrace 30 protruding from a battery cell 10 and an electrode lead 40 protruding from the cell terrace 30. At this time, since the cell terrace 30 is flexible, a deviation in adhesive strength between the cell terrace 30 and the insulating tape 60 can occur, and due to the detachment and flow phenomenon of the insulation tape 60, the unattached section B of the insulating tape 60 can occur as shown in FIG. 4. On the other hand, when an insulating adhesive layer 530 is formed according to the present embodiment, the insulating adhesive layer 530 is in close contact with the boundary between the cell terrace 135 and the electrode lead 160, and thus, the adhesion reliability can be improved.

In addition, by using a one-component liquid adhesive, the cost can be reduced by eliminating the step mixing the stock liquid and the curing agent required for the two-component liquid adhesive.

Figure 5:
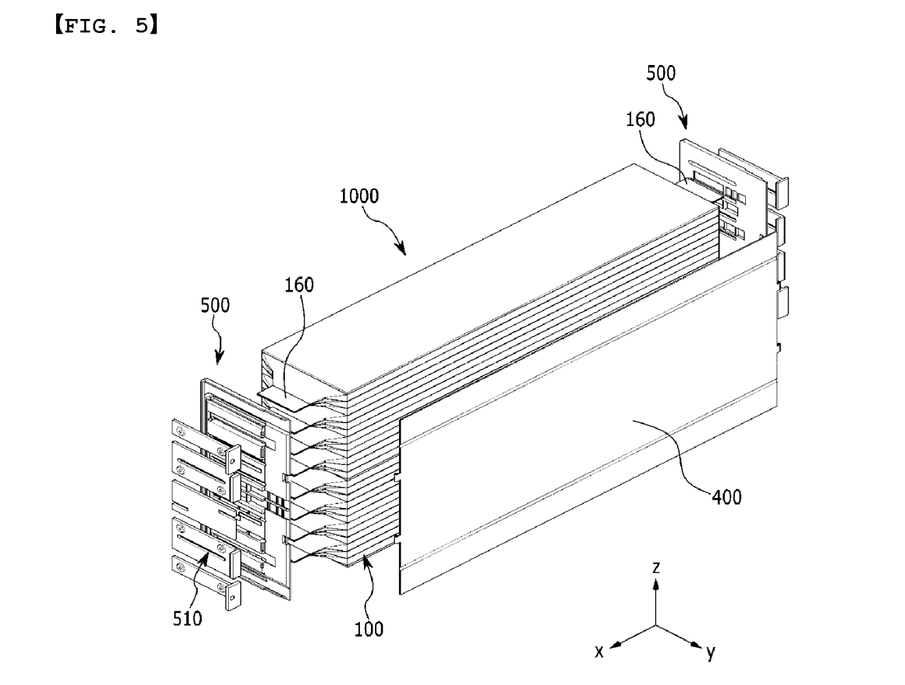
FIG. 5 is an exploded perspective view of a plurality of battery cells and a busbar frame included in a battery module according to one embodiment of the present disclosure.
Figure 6:
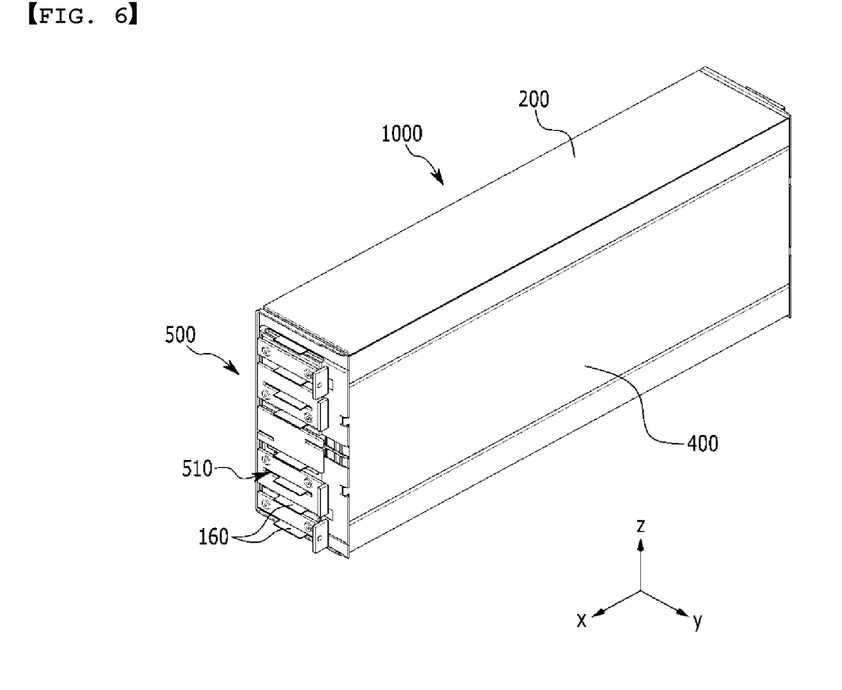
FIG. 6 is a perspective view showing a state in which a plurality of battery cells and a busbar frame of FIG. 5 are combined.
Figure 7:
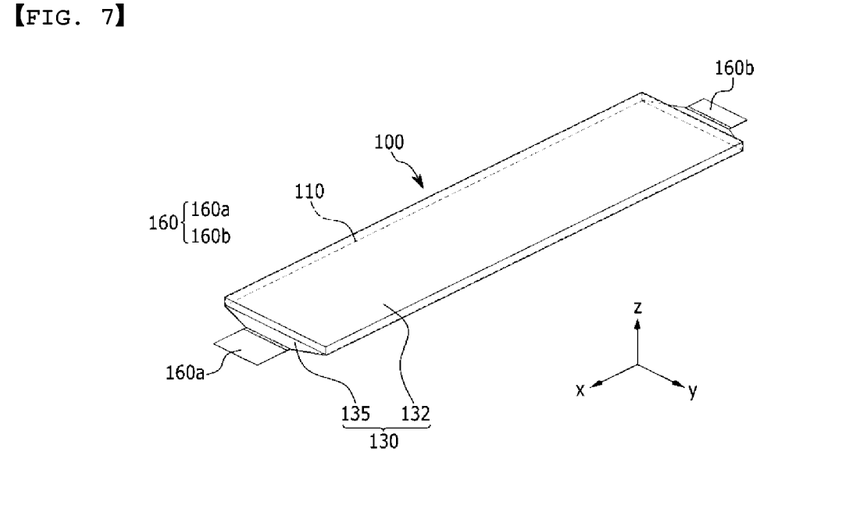
FIG. 7 is a perspective view of a battery cell included in the battery module of FIG. 6.

FIG. 5 is an exploded perspective view of a plurality of battery cells and a busbar frame included in a battery module according to one embodiment of the present disclosure. FIG. 6 is a perspective view showing a state in which a plurality of battery cells and a busbar frame of FIG. 5 are combined. FIG. 7 is a perspective view of a battery cell included in the battery module of FIG. 6.

Referring to FIGS. 5 and 6, the battery module 1000 according to the present embodiment includes a plurality of battery cells and a busbar frame 500. The battery module 1000 includes a to cover 400 covering a plurality of battery cell stacks, and a busbar frame 500 is mounted at both ends of the top cover 400. A compression pad 200 may be located outside the battery cell stack formed by stacking the plurality of battery cells 100. An electrode tab (not shown) protruding from each of the plurality of battery cells 100 is extended, and connected to the electrode lead 160, and the electrode lead 160 may be inserted into a lead slot 510 formed on the busbar frame 500. The busbar frame 500 includes a first busbar frame and a second busbar frame disposed on mutually different sides. Hereinafter, the configuration of one battery cell 100 will be described with reference to FIG. 7.

The battery cell 100 is a secondary battery, and may be configured as a pouch-type secondary battery. A plurality of the battery cells 100 may be provided, and the plurality of battery cells 100 may be stacked together so as to be electrically connected to each other to form a battery cell stack.

Each of the plurality of battery cells 100 may include an electrode assembly 110, a battery case 130, and an electrode lead 160 protruding from the electrode positive electrode plate, a negative electrode plate, a separator, and the like. The battery case 130 is packaging the electrode assembly 110 and may be composed of a laminate sheet including a resin layer and a metal layer. The battery case 130 may include a case body 132 and a cell terrace 135.

The case body 132 may accommodate the electrode assembly 110. For this purpose, the case body 132 is provided with a housing space capable of accommodating the electrode assembly 110. The cell terrace 135 extends from the case body 132 and may be sealed so as to seal the electrode assembly 110. The electrode lead 160 may be partially protruded on one side of the cell terrace 135, specifically, in the front direction (+X-axis direction) of the cell terrace 135.

The electrode lead 160 may be electrically connected to the electrode assembly 110. The electrode lead 160 may be provided as a pair including a negative electrode lead 160a and a positive electrode lead 160b. A portion of the pair of electrode leads 160 may protrude outside the cell terrace 135 from the front direction (+X-axis direction) and the rear direction (−X-axis direction) of the battery case 130, respectively.

The configuration of the battery cell 100 described above is one example, and the shape of the battery cell 100 for constituting the battery cell stack may be variously modified.

Referring back to FIGS. 5 and 6, the busbar frame 500 is a configuration included in the busbar assembly although it is not illustrated, and the busbar assembly may cover a plurality of battery cells 100 so as to electrically connect the electrode leads 160 of the plurality of battery cells 100. The busbar assembly may cover the plurality of battery cells 100 in the protruding direction (X-axis direction) of the electrode leads 160.

A pair of the busbar assembly may be provided. A pair of the busbar assemblies can be respectively covered so as to electrically connect electrode leads 160 protruding to a front direction (+X-axis direction) of the plurality of battery cells 100 and electrode leads 160 protruding to a rear direction (−X-axis direction) of the plurality of battery cells 100.

Each of the pair of busbar assemblies may include a busbar (not shown) and a cell connection board (not shown) in addition to the busbar frame 500.

The busbar frame 500 may cover the front direction (+X-axis direction) or the rear direction (−X-axis direction) of the plurality of battery cells 100. For this purpose, the busbar frame 500 may be provided to have an area corresponding to the front direction (−X axis direction) or the rear direction (−X axis direction) of the plurality of battery cells 100.

The lead slot 510 is for passing through the electrode leads 160 of the plurality of battery cells 100, and can be formed long along the left and right directions (Y-axis direction) of the busbar frame 500. The lead slot 510 can allow the extension part of the electrode leads 160 of three adjacent battery cells 100 to pass via a cavity. That is, in the present embodiment, the electrode leads 160 of the three battery cells 100 adjacent to each other are extended to form one electrode lead 160 group, and the electrode leads 160 included in the electrode lead 160 group pass through a lead slot 510, and then they can be electrically connected through a laser welding with a busbar at the rear surface of the busbar frame 500. The lead slots 510 adjacent to each other may pass through the electrode leads 160 having mutually different polarities. In other words, when one lead slot 510 among the lead slots 510 adjacent to each other passes through the electrode leads 160 of the positive electrode, and another lead slot 510 of the adjacent lead slots 510 may pass through the electrode leads 160 of the negative electrode. The negative electrode lead may be formed of copper, and the positive electrode lead may be formed of aluminum.

A plurality of lead slots 510 may be provided, and the plurality of lead slots 510 may be arranged to be spaced apart from each other by a predetermined distance along the vertical direction (Z-axis direction) of the busbar frame 500.

In the present embodiment, the electrode lead arrangement structure of the battery cell 100 appearing on one side surface of the battery cell stack adjacent to one busbar frame 500 may be a structure in which the negative electrode lead and the positive electrode lead are alternately arranged. However, such an alternatively arranged structure is one example, and this lead arrangement structure can be modified depending on design changes of the series and parallel connection structures of the battery cells. In addition, in the present embodiment, it is described that the electrode leads 160 each protruding from three battery cells 100 are extended to form one electrode lead 160 group, but this is only one example, and the connection relationship of the battery cells 100 may be variously changed according to the arrangement of the battery cells 100 connected to the positive electrode lead and the negative electrode lead. Therefore, the number of the battery cells 100 in which the electrode leads 160 for forming one electrode lead 160 group is extended is also not limited to three, and may be variously modified.

The insulating adhesive layer 530 described with reference to FIG. 3 may be formed at a boundary between the cell terrace 135 and the electrode lead 160 included in the battery module 1000 described above. Hereinafter, state in which an insulating adhesive layer 530 is formed between the battery cell stack and the busbar frame be described in detail reference to FIGS. 8 and 9.

Figure 8:
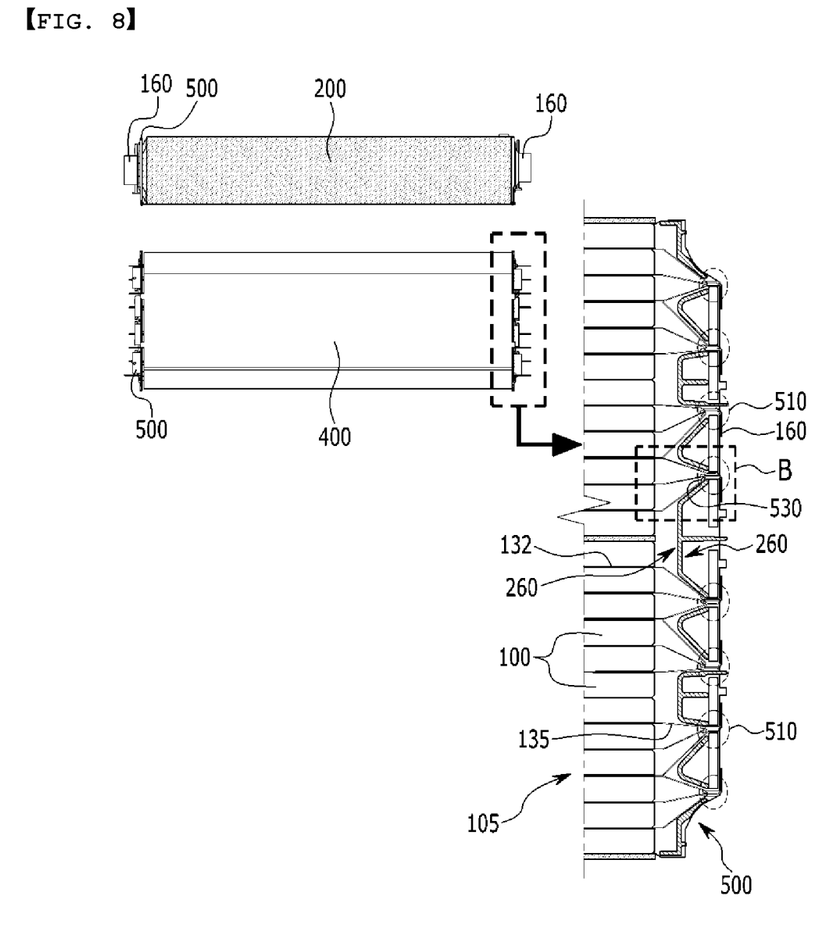
FIG. 8 is a view showing a structure in which a busbar frame is mounted on a battery cell stack according to one embodiment of the present disclosure.
Figure 9:
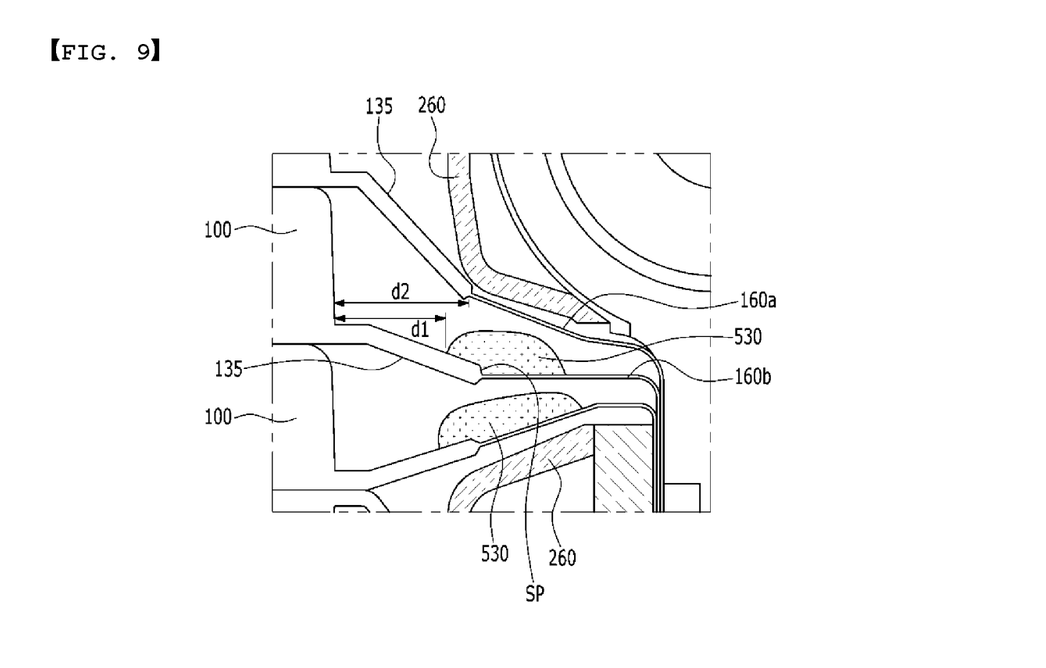
FIG. 9 is an enlarged view of a region "B" in FIG. 8.

FIG. 8 is a view showing a structure in which a busbar frame is mounted on a battery cell stack according to one embodiment of the present disclosure. FIG. 9 is an enlarged view of a region "B" in FIG. 8.

The upper left view of FIG. 8 is a plan view of the structure in which the busbar frame 500 is mounted on the battery cell stack 105, as viewed from above, and the lower left view is a front view of the structure as viewed from the front, and the right view is an enlarged view of a part of the front view. FIG. 9 is an enlarged view of a region "B" in FIG. 8.

Referring to FIG. 8, a cell terrace 135 is formed in which the interval becomes narrower along a direction in which the electrode leads 160 of each of the plurality of battery cells 100 protrude. At this time, the polarities of the electrode leads 160 may be the same. The busbar frame 500 includes a path guider 260. Before forming a cell terrace 135 in which the electrode leads 160 of each of three adjacent battery cells 100 are extended, the path guider 260 is for guiding such that the electrode leads 160 pass through a lead slot 510, and may be formed on one side of the busbar frame 500. Specifically, the busbar frame 500 may include a path guider 260 inside the rear surface of the busbar frame 500 located away from the battery cells 100.

Before passing through the lead slot 510, the path guider 260 can form a predetermined guide space on the back surface of the busbar frame 500 such that the three electrode leads 160 and the extended parts of the case body 132 including the same are close to each other. Therefore, referring to the XYZ coordinates shown in FIG. 6, the width of the guide space may become narrower toward the front direction (+X axis direction) of the busbar frame 500 having the lead slot 510 from the rear direction (−X axis direction) of the busbar frame 500.

A plurality of path guiders 260 may be provided. Here, the plurality of path guiders 260 may be provided to correspond to the number of the plurality of lead slots 510. Thereby, adjacent electrode leads 160 among the plurality of battery cells 100 form a pair for each three, and then the electrode leads 160 pass through the lead slot 510 via the respective path guiders 260 to form a group of electrode leads 160. At this time, the insulating adhesive layer 530 may be formed at a boundary where the cell terrace 135 and the electrode lead 160 meet. The insulating adhesive layer 530 may be located between electrode leads 160 adjacent to each other. The polarities of the electrode leads 160 adjacent to each other with the insulating adhesive layer 530 being interposed therebetween may be the same. At least one insulating adhesive layer 530 may be formed between the path guiders 260 adjacent to each other among the path guiders 260.

Referring to FIGS. 8 and 9, the electrode lead 160 is inserted into the lead slot 510 formed on the busbar frame 500, and the one end of the cell terraces 135 adjacent to each other and the electrode lead 160 connected to the other end may maintain a separation state by the insulating adhesive layer 530.

Referring to FIG. 9, the linear distance d1 from the end of the insulating adhesive layer 530 to the end of the battery cell 100 can be equal to or shorter than a shorter linear distance d2 of the linear distances from a starting point where each of the first electrode lead 160a and the second electrode lead 160b adjacent to each other, with the insulating adhesive layer 530 being interposed therebetween, protrude from the cell terrace 135, to the end of the battery cell 100.

The number or electrode leads 160 forming the electrode lead 160 group is not limited to three, and may be modified according to the arrangement of the electrode leads of the positive and negative electrodes of the battery cell 100.

Figure 10:
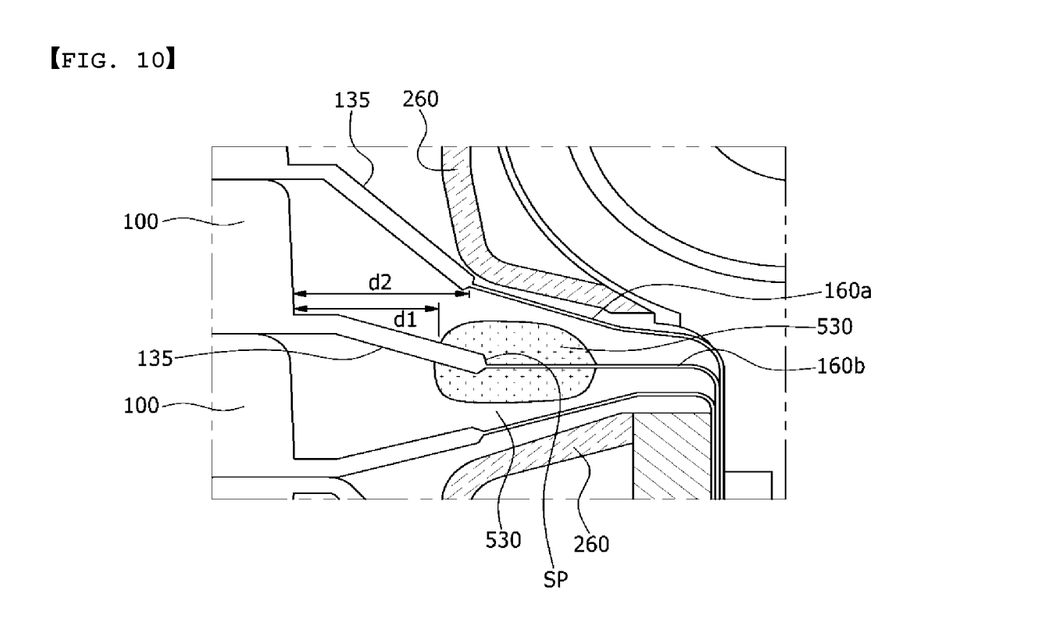
FIG. 10 is a view showing an embodiment in which the arrangement of the insulating adhesive layer of FIG. 9 is modified.

FIG. 10 is a view showing an embodiment in which the arrangement of the insulating adhesive layer of FIG. 9 is modified.

Referring to FIG. 10, the battery module according to the present embodiment shows a state in which an insulating adhesive layer 530 is respectively formed on both sides of one electrode lead 160b. According to such a structure, a step of applying a one-component liquid adhesive for forming an insulating adhesive layer 530 on all of the battery cells 100 sequentially stacked in the battery cell stack is unnecessary, and it can be applied to both sides of one battery cell 100 via inversion of the battery cell. Here, the electrode lead 160 includes a first electrode lead 160a, a second electrode lead 160b, and a third electrode lead located below the second electrode lead 160b. The insulating adhesive layer 530 is a first insulating adhesive layer 530 located between the first electrode lead 160a and the second electrode lead 160b, and a second insulating adhesive layer 530 located between the second electrode lead 160b and the third electrode lead. Both the first insulating adhesive layer 530 and the second insulating adhesive layer 530 may come into contact with the second electrode lead 160b.

FIGS. 11 to 14 are views showing a method for manufacturing a battery module according to another embodiment of the present disclosure.

Figure 11:
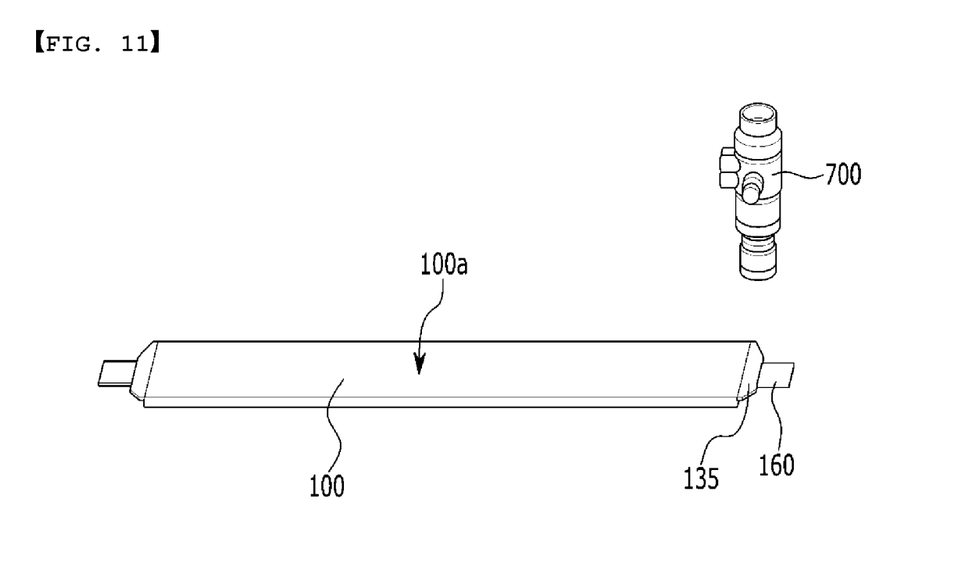
FIGS. 11 to 14 are views showing a method for manufacturing a battery module according to another embodiment of the present disclosure.

Referring to FIG. 11, a method for manufacturing a battery module according to the present embodiment includes disposing a jetting valve 700 as an example of a supply part of a one-component liquid adhesive on one surface 100a of one battery cell 100.

Figure 12:
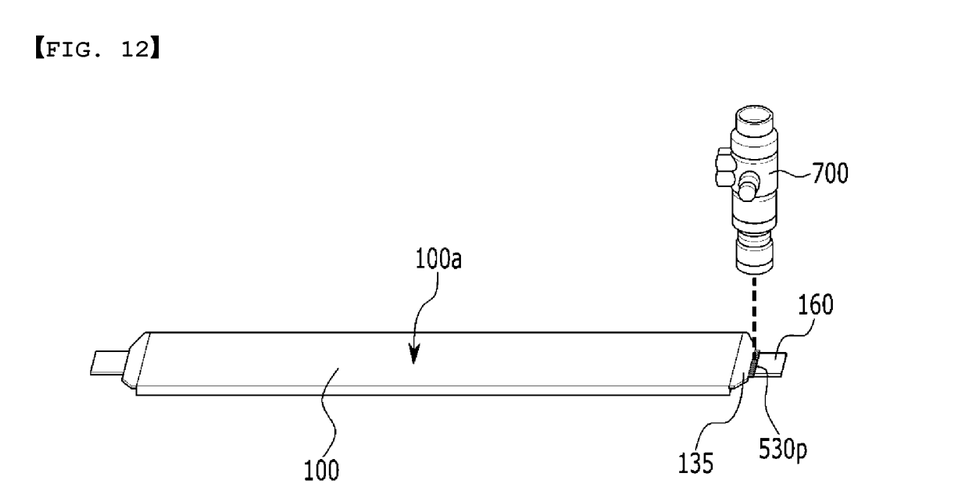

Referring to FIG. 12, the method for manufacturing the battery module according to the present embodiment includes forming a one-component liquid adhesive 530p at the boundary between the cell terrace 135 and the electrode lead 160 located on the same plane as one surface 100a of the battery cell 100 via a jetting valve 700. For the one-component liquid adhesive 530p, it is desirable to use material having a certain level of viscosity in order to reduce the problem of flowing down before initial curing after application. To determine a material having a certain level of viscosity, it is possible to take into account the viscosity capable of controlling a contamination in the process and a coating thickness. In the one-component liquid adhesive according to the present embodiment, since only the polymer remains at 100% after the solvent is cured, it is not separated from the cell terrace, and the initial bonding position can be maintained as it is. In contrast, in the conventional insulating tape, the solid content of the adhesive component is applied onto the base film, and when the shape of cell terrace is changed, it is difficult to closely adhere by 100% to the surface of cell terrace due to the rigidity of the base film.

Figure 13:
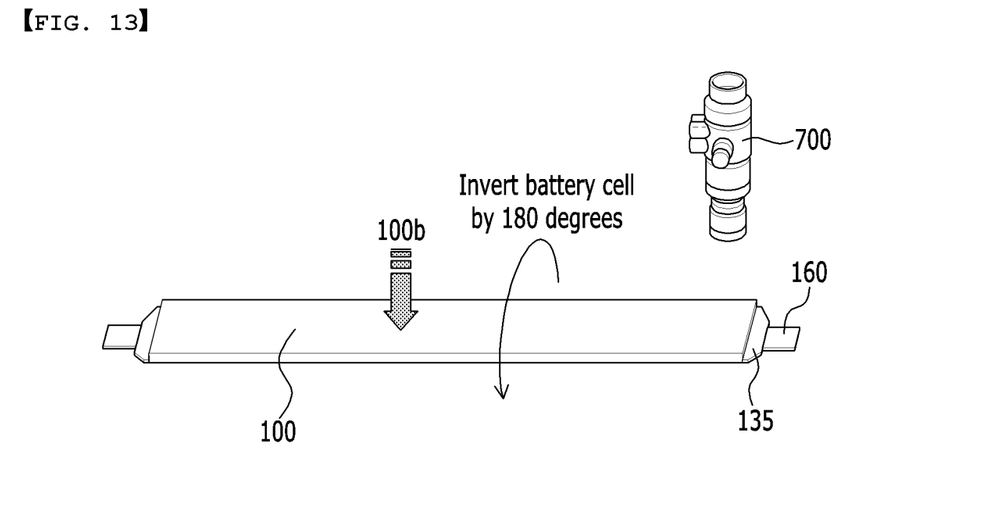

Referring to FIG. 13, a method for manufacturing a battery module according to the present embodiment includes inverting the battery cell 100 by 180 degrees such that the other surface 100b of the battery cell 100 is directed toward the jetting valve 700.

Figure 14:
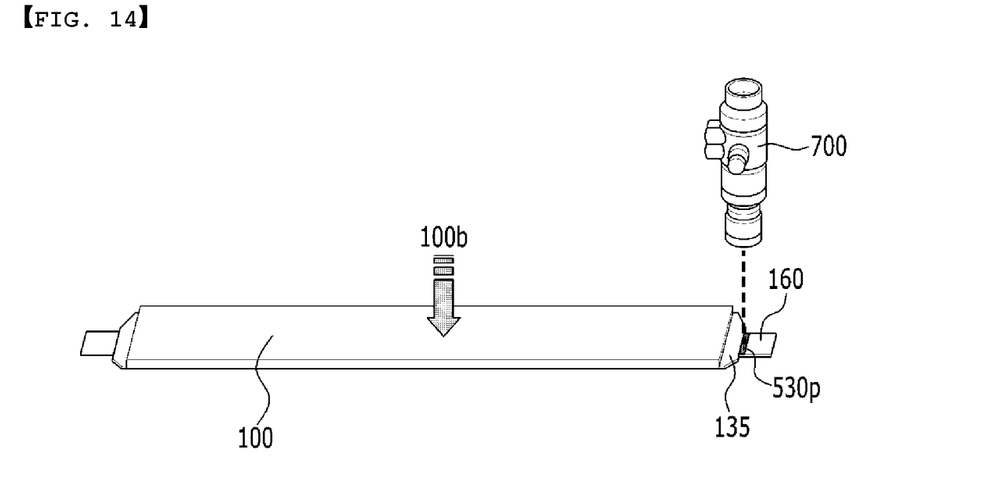

Referring to FIG. 14, the method for manufacturing the battery module according to the present embodiment includes forming a one-component liquid adhesive 530p at the boundary between the cell terrace 135 and the electrode lead 160 located on the same plane as the other surface 100b of the battery cell 100 via the jetting valve 700.

After the above-mentioned insulating adhesive layer 530 is formed by forming the one-liquid liquid adhesive 530p described in FIGS. 12 and 13 except for the steps of FIGS. 13 and 14, plurality of battery cells are stacked to form a battery cell stack, and the battery cell stack is connected to the busbar frame. Thereby, the battery module having the form shown in FIG. 9 can be manufactured.

After the above-mentioned insulating adhesive layer 530 is formed by forming the one-component liquid adhesive 530p including all of the steps described in FIGS. 11 to 14, a plurality of battery cells are stacked to form a battery cell stack, and the battery cell stack is connected to the bar frame. Thereby, the battery module having the form shown in FIG. 10 can be manufactured. At this time, the step of forming the one-component liquid adhesive 530p described with reference to FIGS. 11 to 14 may be partially applied without being applied to all of the plurality of battery cells. For example, a one-liquid liquid adhesive 530p may be formed on both surfaces, one in every two of the plurality of battery cells.

Although the present disclosure has been described above as using a jetting valve application method, it is not limited thereto, and a one-component liquid adhesive can also be applied by a spray method or a pad printing method. In the case of the jetting valve method, there is an advantage that it can be applied only to a desired location. In the case of the spray method, not only it can be applied at a desired location, but also it can be applied to a thinner thickness. In the case of the pad printing method, it can be applied at a desired location in the same manner and can be applied to a thinner thickness compared to the spray method. In the case of the jetting valve method, the width of application can be made thinner than the spray method, and unlike the pad printing method, an ultraviolet curing step is not required.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

135: cell terrace
160: electrode lead
500: busbar frame
530: insulating adhesive layer
530p: one-component liquid adhesive

The invention claimed is:
1. A battery module comprising:
a battery cell stack in which a plurality of battery cells are stacked,
a busbar frame connected to the battery cell stack;
a plurality of cell terraces, each cell terrace of the plurality of cell terraces protruding from a respective one of the plurality of battery cells;
a plurality of electrode leads, each electrode lead of the plurality of electrode leads protruding from a respective one of the plurality of cell terraces; and
an insulating adhesive layer covering a boundary between the cell terrace and the electrode lead of at least one of the plurality of battery cells,
wherein the plurality of battery cells includes a first battery cell adjacent a second battery cell, the first battery cell having a first cell terrace and a first electrode lead, the second battery cell having a second cell terrace and a second electrode lead,
wherein the insulating adhesive layer covers an outer surface of the first cell terrace and a surface of the first electrode lead to cover a stepped part formed by an outer edge of the first cell terrace and the first electrode lead, and
wherein the first cell terrace and second cell terrace become closer to each other along a direction in which the electrode leads protrude out.
2. The battery module of claim 1, wherein the insulating adhesive layer is formed of a one-component liquid adhesive.

3. The battery module of claim 1, wherein the first electrode lead and the second electrode lead have a same polarity.

4. The battery module of claim 1, wherein each electrode lead of the plurality of electrode leads is inserted into a lead slot formed on the busbar frame, and the first electrode lead and the second electrode lead maintain a separation state by the insulating adhesive layer.

5. The battery module of claim 1, wherein a linear distance from an end of the insulating adhesive layer to an end of the first battery cell is equal to or shorter than a shorter linear distance of the linear distances from a starting point where each of the first electrode lead and the second electrode lead protrude from the cell terrace, to the end of the first battery cell.

6. The battery module of claim 1, wherein the first electrode lead and the second electrode lead pass through a lead slot formed on the busbar frame, and meet and are welded at a rear surface of the busbar frame.

7. The battery module of claim 1, wherein a plurality of path guiders for separating the plurality of electrode leads are formed on the busbar frame, and at least one insulating layer is formed between the path guiders adjacent to each other among the plurality of path guiders.

8. The battery module of claim 1, wherein the plurality of electrode leads further includes a third electrode lead adjacent to the first electrode lead, the first electrode lead being between the second electrode lead and third electrode lead,
wherein the insulating adhesive layer includes a first insulating adhesive layer located between the first electrode lead and the second electrode lead, and a second insulating adhesive layer located between the first electrode lead and the third electrode lead, and
wherein the first insulating adhesive layer and the second insulating adhesive layer are in contact with the first electrode lead.

9. The battery module of claim 1, wherein the insulating adhesive layer is a cured liquid adhesive.

10. The battery module of claim 1, wherein the insulating adhesive layer is on both sides of the cell terrace.

11. The battery module of claim 1, wherein the insulating adhesive layer conforms to a shape of the surface of the terrace, the surface of the electrode lead and the stepped part.

12. A method for manufacturing a battery module comprising the steps of:
stacking a plurality of battery cells to form a battery cell stack, each of the plurality of battery cells having a cell terrace and an electrode lead, the plurality of battery cells comprising a first battery cell having a first cell terrace and a first electrode lead and a second battery cell having a second cell terrace and a second electrode lead; and
connecting a busbar frame to the battery cell stack; and
forming an insulating adhesive layer on an outer surface of the terrace and a surface of the electrode lead to cover a stepped part formed by an outer edge of the first cell terrace and the first electrode lead, the insulating adhesive layer being between the first cell terrace and the second cell terrace,
wherein the insulating adhesive layer is located between the first electrode lead and the second electrode lead,
wherein the insulating adhesive layer is a one-component liquid adhesive that conforms to a step formed at a boundary between the first electrode lead and the first cell terrace, and
wherein the first cell terrace and second cell terrace become closer to each other along a direction in which the electrode leads protrude out.

13. The method for manufacturing the battery module of claim 12, wherein the one-component liquid adhesive is applied using one of a jetting valve, a spray method, and a pad printing method.

14. The method for manufacturing the battery module of claim 12, wherein the step of forming the insulating adhesive layer comprises:
disposing a supply part of the one-component liquid adhesive on a first surface of the first battery cell;
forming the one-component liquid adhesive at a boundary between the first cell terrace and the first electrode lead located on the first surface of the battery cell via the supply part;
inverting the battery cell by 180 degrees such that a second side-surface of the battery cell is directed toward the supply part; and
forming the one-liquid liquid adhesive at a boundary portion between the first cell terrace and the first electrode lead located on the second surface of the battery cell.

* * * * *